United States Patent [19]
Kermode et al.

[11] Patent Number: 6,018,359
[45] Date of Patent: Jan. 25, 2000

[54] SYSTEM AND METHOD FOR MULTICAST VIDEO-ON-DEMAND DELIVERY SYSTEM

[75] Inventors: Roger G. Kermode, Chicago, Ill.; Henry Holtzman, Boston, Mass.

[73] Assignee: Massachusetts Institute of Technology, Cambridge, Mass.

[21] Appl. No.: 09/066,062

[22] Filed: Apr. 24, 1998

[51] Int. Cl.[7] .................................................. H04N 7/10
[52] U.S. Cl. ............................ 348/7; 345/328; 709/719; 455/4.2
[58] Field of Search ..................... 348/7, 12, 13, 348/10, 17; 345/327, 328; 455/4.2; 709/217–219

[56] References Cited

U.S. PATENT DOCUMENTS

| | | | |
|---|---|---|---|
| 5,453,779 | 9/1995 | Dan et al. | 348/7 |
| 5,568,180 | 10/1996 | Okamoto | 348/7 |
| 5,612,742 | 3/1997 | Krause et al. | 348/385 |
| 5,701,582 | 12/1997 | DeBey | 455/5.1 |
| 5,720,037 | 2/1998 | Biliris et al. | 345/327 |
| 5,721,815 | 2/1998 | Ottesen et al. | 395/200.9 |
| 5,721,823 | 2/1998 | Chen et al. | 348/7 |
| 5,724,646 | 3/1998 | Gauek et al. | 348/7 |
| 5,764,893 | 6/1998 | Okamoto et al. | 395/200.08 |
| 5,768,518 | 6/1998 | Hirashima | 348/7 |
| 5,793,412 | 8/1998 | Asamizuya | 348/7 |
| 5,793,971 | 8/1998 | Fujita et al. | 348/7 |
| 5,808,607 | 9/1998 | Brady et al. | 345/327 |
| 5,831,662 | 11/1998 | Payton | 348/7 |
| 5,884,141 | 3/1999 | Inoue et al. | 348/7 |

OTHER PUBLICATIONS

K. A. Hua et al., "Skyscraper Broadcasting: A New Broadcasting Scheme for Metropolitan Video–on–Demand Systems", *ACM SIGCOMM '97* (1997).

*Primary Examiner*—Victor R. Kostak
*Attorney, Agent, or Firm*—Cesari and McKenna, LLP

[57] ABSTRACT

A video-on-demand system divides video files into sequentially organized data segments for transmission and playback. Each segment is repeatedly transmitted in a looping fashion over a transmission channel. The rate of transmission is equal to or greater than the playback rate, and the lengths of the segments are chosen such that: (i) the receiver tunes into no more than a fixed number of channels (preferably two) at any one time; (ii) the receiver tunes into a new channel only after an entire segment has been received from a previous channel; and (iii) until a maximum segment length is attained, data is received from no fewer than two channels. The segments are sequentially presented even as new segments are being downloaded. When the display rate is equal to the transmission rate, it is found that the foregoing conditions are satisfied when the relative lengths of the segments form a modified Fibonacci sequence.

16 Claims, 8 Drawing Sheets

SYSTEM AND METHOD FOR MULTICAST VIDEO-ON-DEMAND DELIVERY SYSTEM

FIELD OF THE INVENTION

The present invention relates to transmission of video programming, and in particular to a system for providing video-on-demand services to a large subscriber base.

BACKGROUND OF THE INVENTION

The proliferation of broadcast television stations and cable operators have provided television viewers with a large and ever-increasing variety of content choices. Traditional delivery systems, however, require temporally fixed programming—that is, all viewers must tune into a particular broadcast at the time it is shown. This frees the broadcaster from the need to establish separate interactive communication circuits with individual viewers, allowing the audience to increase virtually without limit and without an increase in utilized bandwidth.

For over a decade, attempts have been made to circumvent this programming model and allow viewers to tune into broadcasts at their convenience rather than at a single scheduled time. Ideally, it should be possible for many viewers to obtain access to particular content at arbitrarily different times, notwithstanding the time of day or the number of users simultaneously requesting access. But efforts to realize true "video-on-demand" (VOD) in widespread form, with any subscriber free to request any video program at any time, have yet to bear fruit.

The reason for the slow progress lies in the difficulty of inexpensively delivering content in a manner that scales to a very large number of receivers. The most intuitively simple solution, in which a central service provides separate transmissions of the same program to individual subscribers upon their requests—in effect, re-running a video over an independent communication channel to each viewer—requires duplication of equipment and substantial bandwidth resources. For this reason, much research has been devoted to batching algorithms that aggregate requests from many receivers into a smaller number of common channels. Aggregation is achieved by delaying the stream for one or more receivers by a small amount of time so that it may be merged with subsequent streams.

Aggregation algorithms may be "user-centered" or "data-centered." User-centered aggregation techniques allocate data channels in response to user requests. For example, if two subscribers issue requests for the same video a small time interval apart, then by delaying the playback for the first request, both requests can be satisfied from the same server data stream. In one user-centered approach, called "scheduled rnulticast," when a server channel becomes available the server selects, based on a scheduling policy, a group of users to which the video is transmitted. For example, in accordance with Dan et al., "Scheduling Policies for an On-Demand Video Server with Batching," *Proc. of ACM Multimedia,* pages 15–23 (October 1994), the batch with the largest number of pending requests is served first, with the objective of maximizing server throughput.

Data-centered techniques allocate transmission channels to pieces of the transmitted content in a predefined manner, relying on the receivers to determine the proper channel from which to receive data. For example, in accordance with the "periodic broadcast" approach, videos are broadcast periodically over a plurality of channels so that a new multicast data stream is started every B minutes (the "batching interval"). In this way, no subscriber can experience a service latency of more than B minutes. Decreasing the batching interval naturally requires a proportionate increase in server bandwidth.

The "pyramid broadcasting" (PB) technique was developed to reduce the service latency without linear bandwidth increases. See Viswanathan et al., "Pyramid Broadcasting for Video on Demand Service," *IEEE Multimedia Computing and Networking Conf.* 2417:66–77 (1995). In accordance with the PB technique, each video data file is partitioned into K segments of geometrically increasing size with the server transmission capacity evenly divided into K logical channels. Each channel broadcasts an assigned video segment repeatedly, in an infinitely looping fashion. The subscriber's receiver sequentially downloads the various video segments, playing back previously downloaded segments even as new ones are loaded. Thus, playback can commence as soon as the first segment is fully downloaded; and since this segment is the shortest, the period of download before playback can commence is relatively short. Moreover, since the initial segments are small, they can be broadcast more frequently through their channels than the larger, later segments; as a result, the "access latency"—i.e., the delay in awaiting transmission of the beginning of the first segment (when download can begin)—is also relatively short.

The exponential nature of this data-fragmentation scheme, however, results in large storage requirements for the receivers. For example, the buffer size is usually greater than 70% of the length of the video. Although this is invisible to the viewer, who can begin viewing the video following the access latency period, the hardware costs can be substantial. For example, devices such as hard disks be employed for data buffering; and because each video segment is transmitted at high data rates, the disks must be capable of extremely high storage and retrieval rates.

The "skyscraper broadcasting" (SB) approach represents an attempt to ameliorate some of the drawbacks of PB. See Hua et al., "Skyscraper Broadcasting: A New Broadcasting Scheme for Metropolitan Video-on-Demand Systems," *Comp. Commun. Rev. ACM SIGCOMM* 27(4) (September 1997). In accordance with the SB approach, the server bandwidth of B Mbits/sec is divided into a series of channels, each representing a separate data stream accessible by the receiver; these may be organized as logical channels in which, for example, data is multiplexed and streamed over a single network communication link, or as separate physical channels (e.g., broadcast at different frequencies over a wireless link). Each of M available videos has a display rate of b Mbits/sec, so the number of channels is B/b, each channel capable of transmitting b Mbits/sec. These channels are allocated evenly among the M videos such that there are K (=B/bM) channels for each video. To broadcast a video over its K dedicated channels, each video file is partitioned into K fragments using a data-fragmentation scheme. Each of these fragments is broadcast repeatedly on its dedicated channel (at b Mbits/sec).

Instead of fragmenting the video files according to a geometric series, as in PB, a series is generated by the following recursive function:

$$f(n) = \begin{cases} 1 & n = 1, \\ 2 & n = 2, 3, \\ 2f(n-1)+1 & n \bmod 4 = 0, \\ f(n-1) & n \bmod 4 = 1, \\ 2f(n-1)+2 & n \bmod 4 = 2, \\ f(n-1) & n \bmod 4 = 3, \end{cases}$$

This function is used to assign relative segment lengths, and produces segments whose lengths are such that the receiver need tune into no more than two channels at any time. Its first few terms are f(n)=[1, 2, 2, 5, 5, 12, 12, 25, 25, 52, 52, 105, 105, 212, 212, 425, 425, . . . ]. In order to prevent the segments from becoming too large, a maximum segment size W is defined. That is, if the SB series f(n) would require some segment to be larger than W times the size of the first segment, the size of that segment is restricted to the relative size W. The effect of this restriction is to limit the necessary buffer space, the maximum size of which is ultimately determined by the length of the last segment. (The term "skyscraper broadcasting" refers to the shape the data fragments would form if stacked, with W determining the width of the skyscraper; in PB, the data fragments would form a short, wide pyramid.)

In operation, each fragment is assigned to one of the K channels, and is continuously streamed in a looping fashion over that channel. To receive the broadcast, a receiver subscribes to each channel in turn, downloading data from a new channel only after only after beginning to play the contents of the segment downloaded from the previous channel. Due to the irregular way segments increase in accordance with SB, receivers utilize two separate loading routines: an "Odd Loader" that downloads segments corresponding to the odd terms in the SB series, and an "Even Loader" that downloads segments corresponding to the even terms.

The access latency $D_1$ for SB is defined as the longest period of time a receiver must wait until it can begin loading the first segment:

$$\text{Access Latency} = D_1 = \frac{D}{\sum_{i=1}^{K} \min(f(i), W)}$$

The maximum use of receiver bandwidth occurs when the receiver downloads from two channels while playing a previously cached segment. Accordingly, SB receivers require buffer disks capable of supporting I/O at rates of two to three times the display rate b. The storage requirements of an SB system depend on the lengths of the segments, which begin loading before being played back. The worst case results when the maximum possible amount of the final (largest) segment is cached before its playback begins, and the storage requirement is found to be 60·b·$D_1$·(W−1) Mbits.

Although SB represents an improvement over PB, disadvantages remain. In both schemes, segments must be downloaded from beginning to end; that is, before a receiver can begin downloading a segment, it must wait until the segment has looped back to its beginning. Furthermore, the SB series requires that the receiver frequently download data from only a single channel, thereby making inefficient use of the allocated receiver bandwidth. This limitation also restricts the rate at which segments can grow and, as a result, imposes a lower bound on access latency. This is because the size of the first segment—and, hence, the access latency—is determined by the size of later segments.

DESCRIPTION OF THE INVENTION

Brief Summary of the Invention

The present invention provides a technique for on-demand delivery of streaming data over a small number of channels that overcomes the above-described limitations. In accordance with the invention, segments are downloaded asynchronously—that is, download of a new segment need not await the arrival of its beginning over the transmission channel. Instead, downloading of the segment may be loaded beginning at any point in the segment, and the data is reordered following download or during presentation.

In a second aspect, the lengths of the segments in accordance with the invention are chosen such that transmission channels are efficiently utilized. In a system permitting download from a maximum of two channels, for example, data is continuously received from both channels; at no point—unless a maximum segment length is specified—does the system receive data from fewer than two channels until the penultimate segment has been fully downloaded.

In a third aspect, the invention utilizes a pre-caching scheme whereby the first segments one or more videos is cached within the receiver. This eliminates the access latency otherwise associated with these videos, which are preferably chosen in accordance with likely user preference. Pre-caching also permits the use of smaller numbers of segments; in the absence of caching, by contrast, larger numbers of segments are preferred in order to minimize access latency (by reducing the length of the first segment).

In accordance with the invention, a video file, such as a movie, is divided into a series of sequentially organized data segments. Each segment is repeatedly transmitted in a looping fashion over a one of the transmission channels. The rate of transmission is equal to or greater than the playback rate, and the lengths of the segments are chosen such that: (i) the receiver tunes into no more than a fixed number of channels (preferably two) at any one time; (ii) the receiver tunes into a new channel only after an entire segment has been received from a previous channel; and (iii) until a maximum segment length is attained, data is received from no fewer than two channels. The segments are sequentially presented even as new segments are being downloaded. When the display rate is equal to the transmission rate, it is found that the foregoing conditions are satisfied when the relative lengths of the segments form a modified Fibonacci sequence.

As used herein, the term "video" is employed generically to connote any temporally related sequence of digitally represented images, regardless of origin or format.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
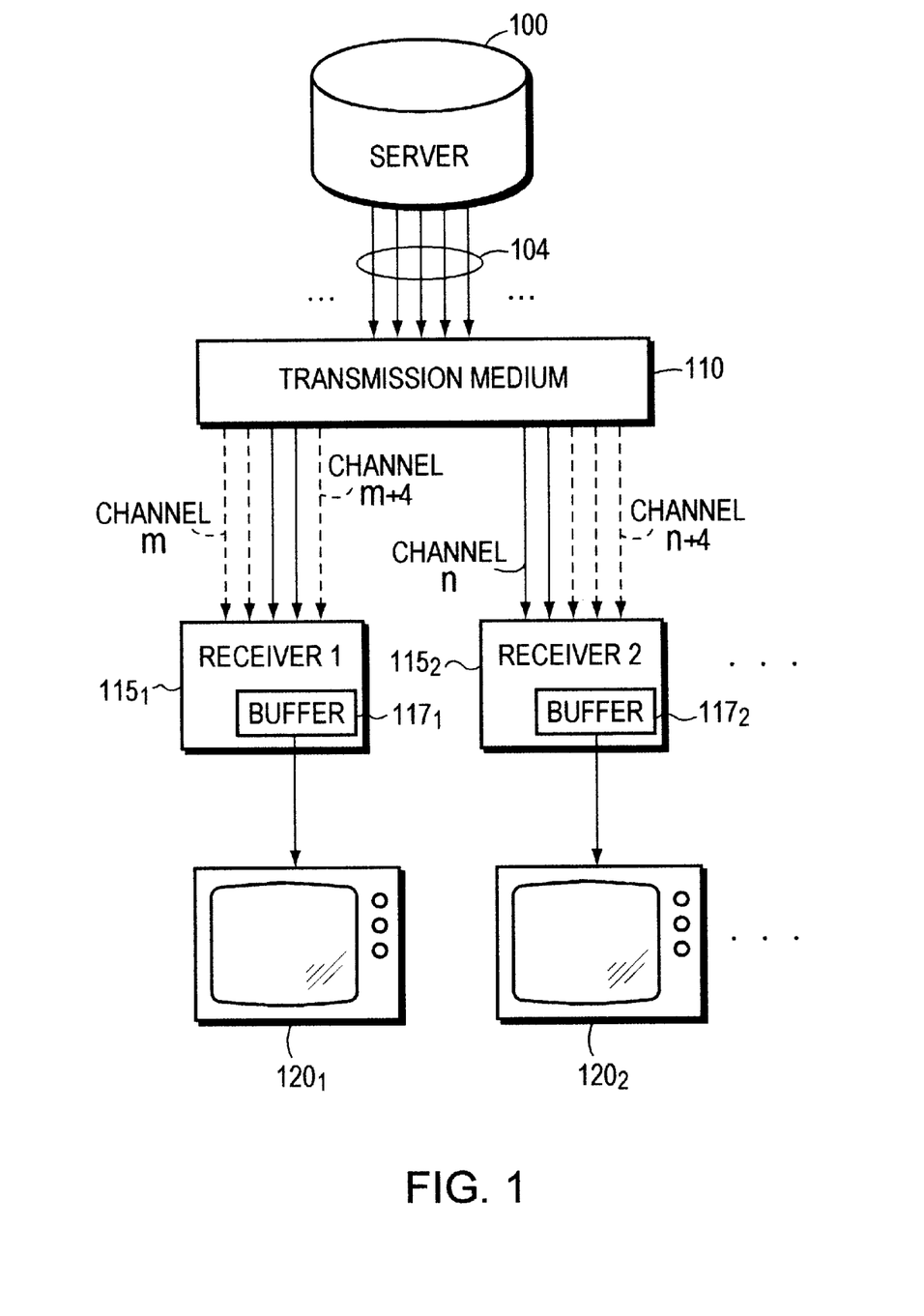
FIG. 1 is a schematic plan showing a representative environment for practice of the invention.

With reference to FIG. 1, the invention is generally implemented using a central video server 100 that sends data organized into a plurality of channels 104 over a transmission medium 110. Transmission medium 110 may be digital or analog, cable-based or wireless. Generally, server 100 is a high-speed computer with large non-volatile storage capacity and very high input/output (I/O) rates. Server 100 stores digitally represented video files and makes these available to subscribers upon request. Server 100 also handles routine "housekeeping" tasks such as subscriber verification and routing of digital video data.

For example, transmission medium 104 may be a conventional analog cable television (CATV) system. Server 100 responds to a subscriber request by accessing the digital file corresponding to the desired video and "streaming" it to the subscriber over the CATV link. Because the data is digital, server 100 modulates it for transmission, and the subscriber's receiver demodulates the incoming signal to reconstruct the digital data.

Shown in the figure are two representative receivers $115_1$, $115_2$, which are connected to server 100 via transmission medium 110 and individually addressable by the server. In a CATV implementation, the receivers are configured as set-top boxes. Each receiver $115_1$, $115_2$ has a processor (not shown) and a memory buffer $117_1$, $117_2$, for temporary storage of video data received from server 100; memory buffer may include non-volatile (e.g., hard disk or optical storage) and/or volatile (e.g., RAM) components, the optimal mix depending on economic considerations and the need for adequate access speeds. The contents of buffer $117_1$, $117_2$ are presented to the subscriber via an associated playback monitor $120_1$, $120_2$. Receivers $115_1$, $115_2$ have conventional interface capability for transferring data from buffers $117_1$, $117_2$ to playback monitors $120_1$, $120_2$.

Monitors $120_1$, $120_2$ may, for example, be standard television sets or televisions equipped to display digitally encoded data; in the former case, receivers $115_1$, $115_2$ convert buffer data to analog form before its transfer to monitors $120_1$, $120_2$. During playback, the contents of buffers are "drained" of data as it is presented even while they are being "filled" with incoming video data from server 100. It is the interplay between storage and playback that determines the maximum necessary size of the buffer for a particular video.

In accordance with the invention, receivers $115_1$, $115_2$ receive video data from two channels, although data from the other channels associated with the video being downloaded remain continuously available. For example, receiver $115_1$ has already received data from channels m and m+1, and is currently receiving data from channels m+2 and m+3; when the segment transmitted over channel m+2 has been fully received, receiver $115_1$ will begin downloading the video segment transmitted over channel m+4. Similarly, receiver $115_2$ is currently receiving data over channels n and n+1; when the segment transmitted over channel n has been fully received, receiver $115_2$ will begin downloading the video segment transmitted over channel n+2. Server 100 is constantly transmitting data over all of these channels; the receivers are free to "tune into" them in accordance with the invention, as discussed below (and assuming proper subscriber authorization). Again, the channels may be logical channels or physical channels. For example, all segments for a particular movie may be transmitted as separate logical channels (e.g., partitioned by time—division multiplexing) over one or more physical channels.

Figure 2:
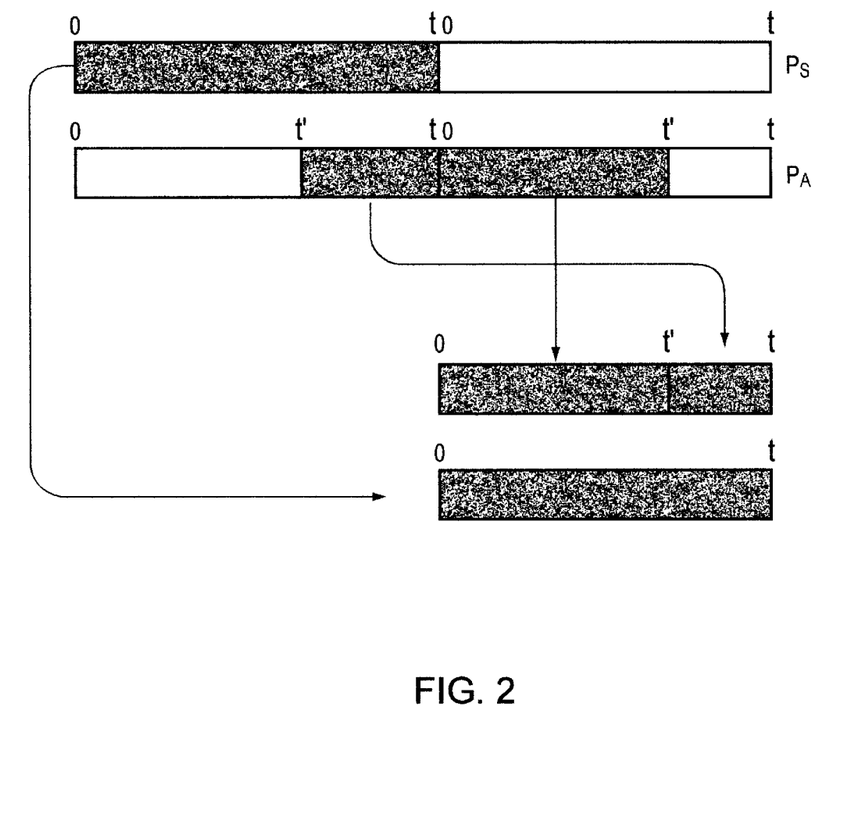
FIG. 2 schematically illustrates the concept of asynchronous download.

The segmentation and transmission scheme of the present invention permits receivers to download segments asynchronously—that is, the receiver can begin downloading from a new channel as soon as a previous segment has been fully downloaded; it is not necessary to wait for the segment to loop back to its beginning. FIG. 2 illustrates the distinction between synchronous and asynchronous modes of downloading. A video partition or segment of duration t is repeated endlessly in a looping fashion over two channels $P_S$, $P_A$. Data is downloaded synchronously over channel $P_S$, meaning that download commences only at time 0—i.e., at the beginning of the segment—and continues until the entire segment has been contiguously downloaded at time t. Data is loaded asynchronously over channel $P_A$, however, so that download may commence at an arbitrary time t' and continue until time t' is reached during the next iterative transmission of the segment. The receiver is programmed to store the initially downloaded fragment t'—t at the end of the buffer slot reserved for this segment, and to store the subsequently downloaded fragment 0—t' at the beginning of the buffer slot so as to form a temporally contiguous segment.

Because in operation the beginning of a segment may be presented even as subsequent portions are being downloaded, it is critical to ensure that playback does not occur (or is not required for temporally continuous playback) before the beginning of a segment is loaded. This feature occurs automatically as a consequence of the preferred segmentation scheme.

That scheme, which may be termed "truncated exponential partitioning" (TEP), is as follows. The relative length L(n) of segment n is given by the series function $$f(n) = \begin{cases} r(1) & n = 1 \\ (1 + f(1))r(2) & n = 2 \\ (f(n-1) + f(n-2))r(n) & n \geq 3 \end{cases}$$

where r(n) is the download rate (expressed as a multiple of the playback rate) for segment n. For r(n)=1 (download rate playback rate), this function produces a Fibonacci sequence missing the first element: f(n)=[1, 2, 3, 5, 8, 13, 21, 43, 55, 89, 144, 233, 377, 610, 987, 1597, 2584, 4181, 6765, 10946 . . . ].

Since segments can grow very quickly in size, it is frequently necessary or useful to impose an upper limit W on the relative partition size. In this case, the relative length L(n) is given by min(f(n), W)—that is, segments that would otherwise be longer are "clipped" to a length of W.

The actual length D(n) of a segment n from a video having a total length D partitioned into p segments is given by $$D(n) = \frac{L(n)}{\sum_{1}^{p} L(n)} D.$$

Figure 3:
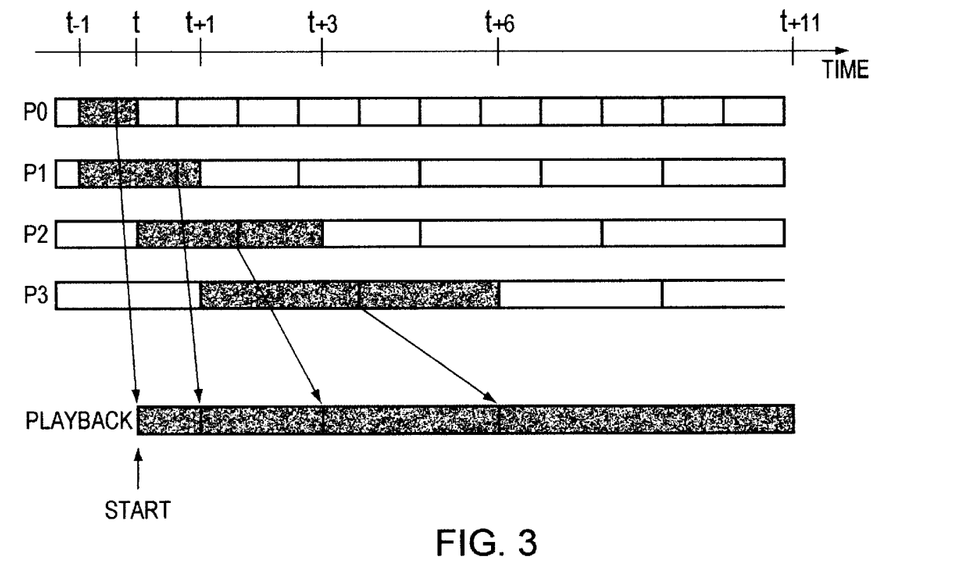
FIG. 3 schematically illustrates asynchronous download in accordance with the invention at a download rate equal to the playback rate.

Segments are preferably downloaded at a rate r(n) at least equal to the playback rate, and desirably faster than than the playback rate. Operation of the invention in a regime where r(n)=1 is illustrated in FIG. 3. Each of a series of segments 0, 1, 2, 3 is repeatedly transmitted over an associated channel P0, P1, P2, P3. As shown in the figure, the segment 0 has a relative length of 1, segment 1 has a relatively length of 2, etc., in accordance with the truncated Fibonacci sequence noted above. The segments are not, however, downloaded synchronously. As a result, the shaded areas representing download are not contiguous with the partition loops. Instead, download of segment 0 is begun at an arbitrary time t−1 (e.g., when a subscriber has activated his set-top box) and continues into the next segment transmission.

Although segments cart be downloaded asynchronously, a segment is not actually played back until it is downloaded in its entirety. This condition ensures that no segment will be played before its beginning has been downloaded. Thus, playback begins at time t. The arrows relate the points at which the beginnings of the various segments occur during transmission to the points during playback when these are actually displayed. To understand how the series formula ensures continuous download from two channels, suppose that segment 0 is one minute long. If playback commences immediately after this segment is downloaded, the receiver buffer will be empty exactly two minutes after download began. Accordingly, if segment 1 is two minutes long, it can begin playing as soon as playback of segment 0 has finished (since download of segment 1 began with download of segment 0 at time t−1). Restricting the receiver to data from two channels at any one time means that download of segment 2 cannot begin until time t, when segment 0 has been fully loaded; and segment 2 cannot be displayed until it has been fully downloaded at time t+3. These conditions are satisfied if segment lengths are set in accordance with the TEP series formula, while asynchronous download ensures that the segments grow as quickly as possible (since the maximum allowed bandwidth is constantly used).

Figure 4:
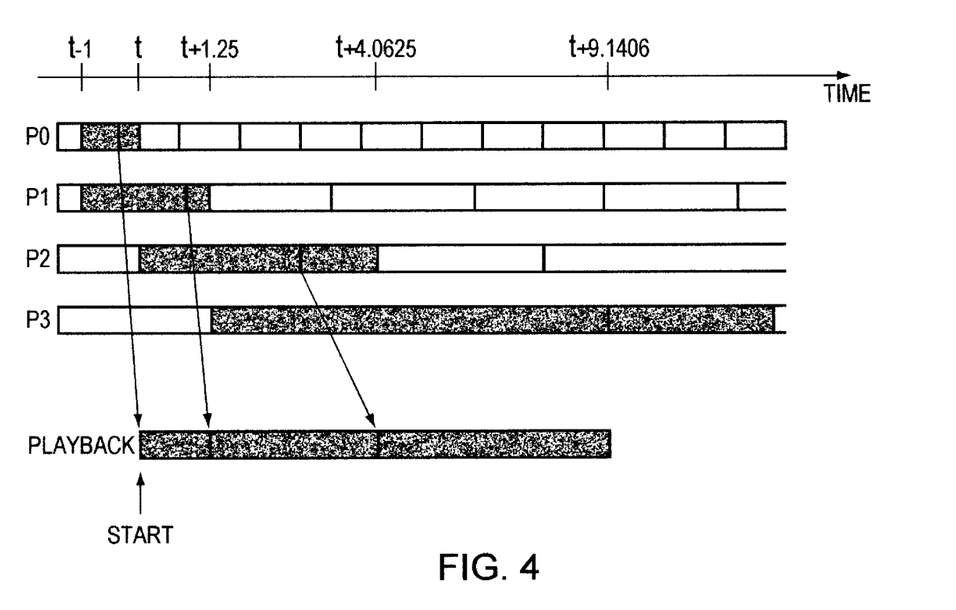
FIG. 4 schematically illustrates asynchronous download in accordance with the invention at a download rate greater than the playback rate.

FIG. 4 illustrates operation of the invention in a regime where r(n)>1 (in particular, r(n)=1.25, so that the download rate is 25% faster than the playback rate) is shown in FIG. 4. Because of the faster loading rate, segments are retrieved more quickly and therefore can be played back sooner. They also grow more quickly. To appreciate why this is so, consider once again an initial segment 0 that loops every minute. Since r(n)=1.25, the segment carries 25% more data, i.e., an additional 15 seconds for a total length of 75 seconds. This means that the second segment 1 can be 15 seconds longer and, consequently, the third segment 2 can begin 15 seconds later. The effect of longer partitions and later starting times is compounded with each successive partition, resulting in fewer and longer partitions required to achieve a given access latency.

Optimal performance occurs when W is set to a segment length consistent with the TEP series formula, which ensures constant utilization of both download channels. Otherwise, the receiver will download segments prematurely or enter a cycle of temporal gaps (and consequent unused bandwidth) between downloads.

Figure 5A:
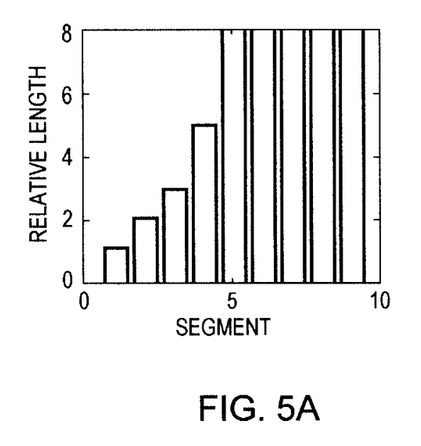
FIGS. 5A, 5B and 5C illustrate relative partition lengths, bandwidth utilization, and storage requirements, respectively, at a download rate equal to the playback rate.
Figure 5B:
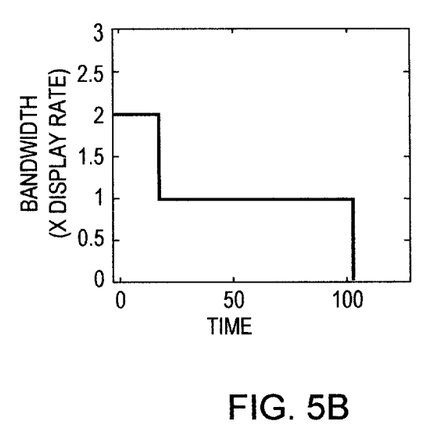
Figure 5C:
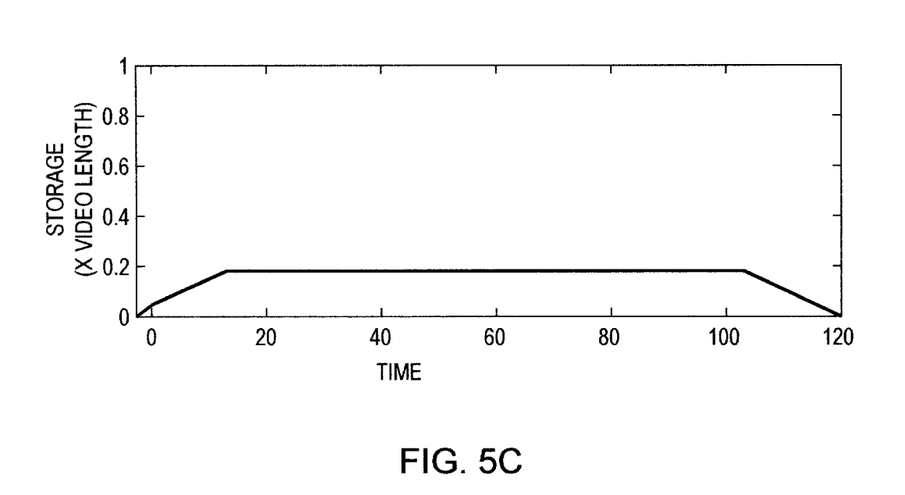

Refer now to FIGS. 5A–5C, which illustrate various performance criteria associated with the invention when the download rate is equal to the playback rate. FIG. 5A illustrates the relative length of the successive partitions, with a first segment of unit length. FIG. 5B depicts bandwidth utilization over the course of a 120-minute video where segments are clipped to a maximum allowed length. The bandwidth, expressed as a multiple of the display rate, is equal to 2 while two channels are being used—that is, while segments are growing. When the segments reach the maximum allowed length and are clipped, data is downloaded as fast as it is consumed for display, and is received over a single channel; accordingly, the utilized bandwidth falls to 1. Toward the end of the movie, when the remainder of the video data has been cached, bandwidth utilization falls to zero and data is drawn only from the buffer. As shown in FIG. 5C, the storage (buffer) requirements of the receiver never rise above 20% of the length of the entire video. Buffer utilization peaks when the first segment has been fully downloaded, and begins to decline when the penultimate segment begins to play.

Figure 6A:
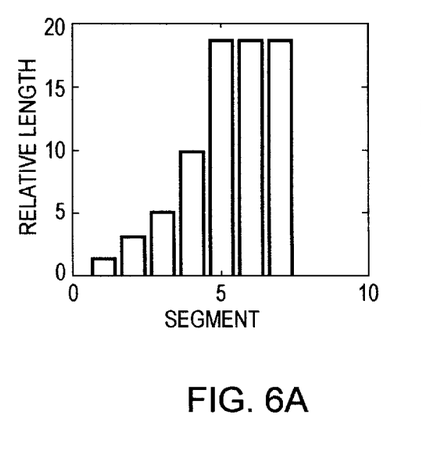
FIGS. 6A, 6B and 6C illustrate relative partition lengths, bandwidth utilization, and storage requirements, respectively, at a download rate greater than the playback rate.
Figure 6B:
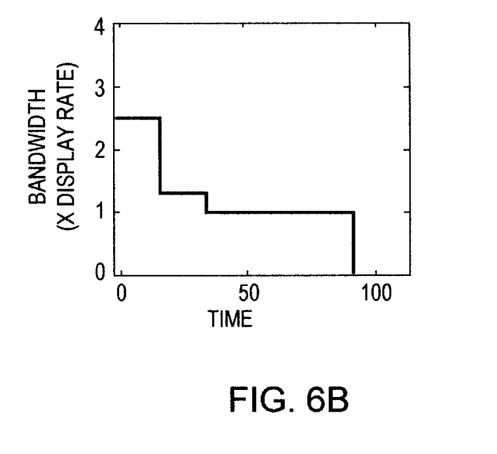
Figure 6C:
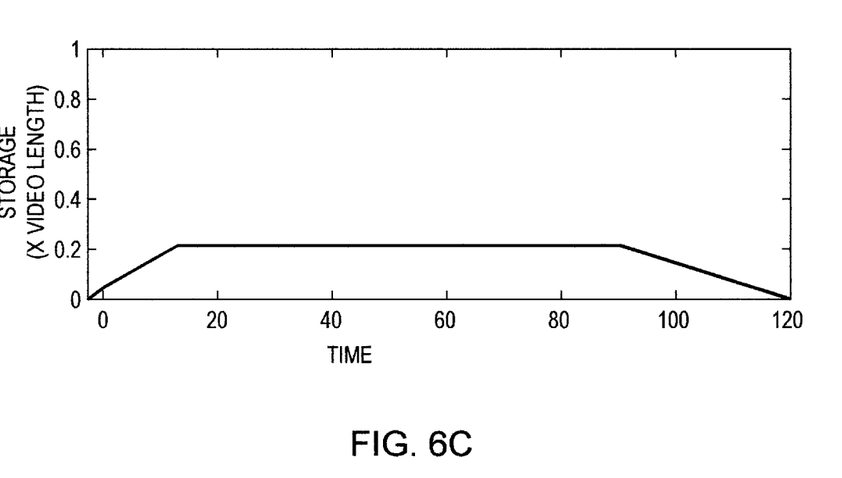

Similar data are plotted for r(n)=1.25 in FIGS. 6A–6C. FIG. 6A illustrates how much more rapidly the segments grow when the download rate exceeds the playback rate, until a maximum allowed size is attained. Again, because the segments are clipped, bandwidth utilization drops from 2.5 (i.e., the r(n) value of 1.25 over two utilized channels) to 1.25 (when a single channel is used) to 1 (when data cannot be received at a rate greater than the playback rate). Despite the rapid segment growth, curtailment of the maximum length results in storage requirements below 30% of the video length.

Figure 7A:
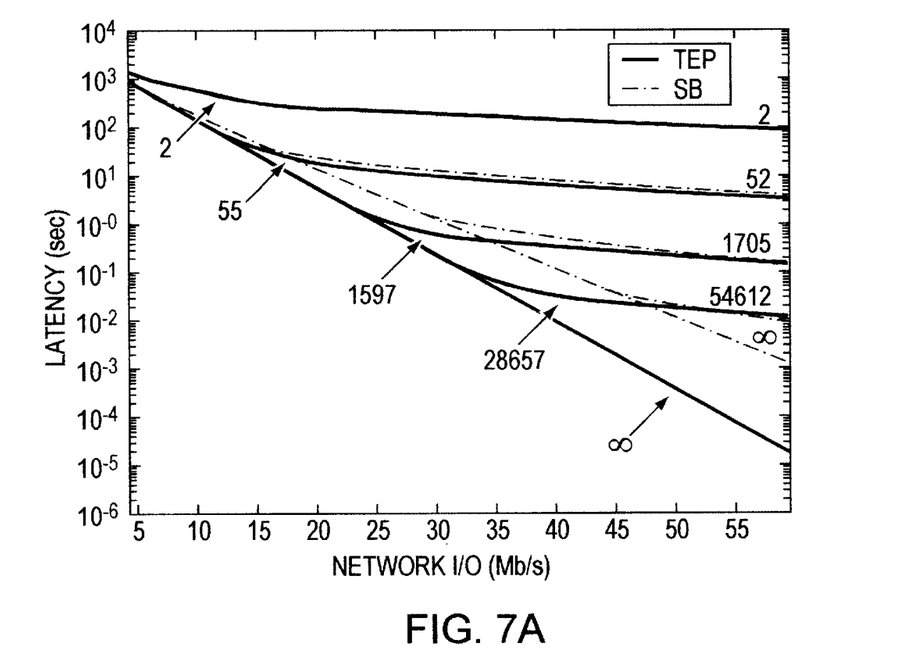
FIGS. 7A and 7B illustrate comparative performance criteria at a download rate equal to the playback rate.
Figure 7B:
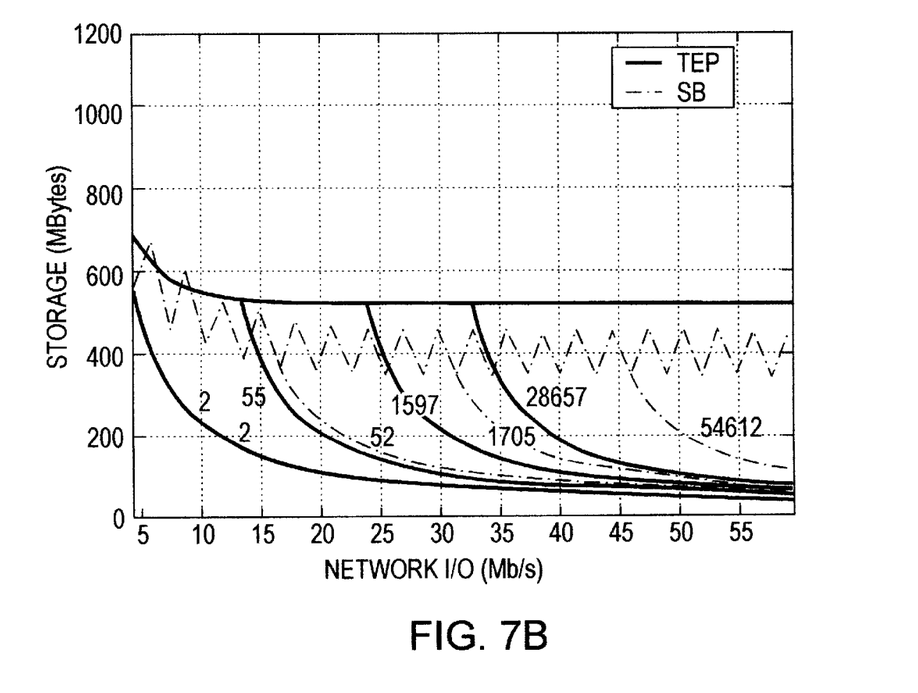
Figure 8A:
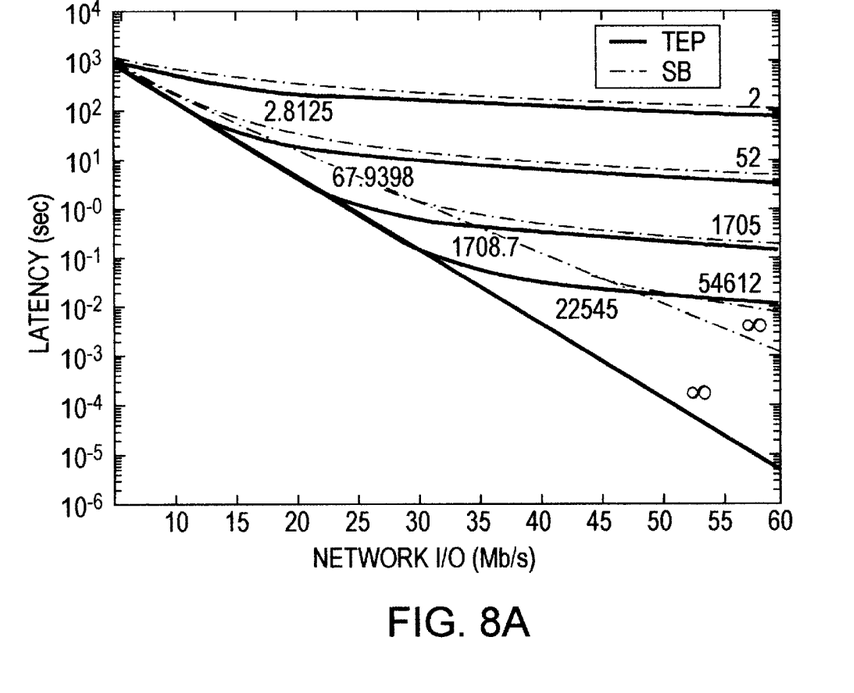
FIGS. 8A and 8B illustrate comparative performance criteria at a download rate greater than the playback rate.
Figure 8B:
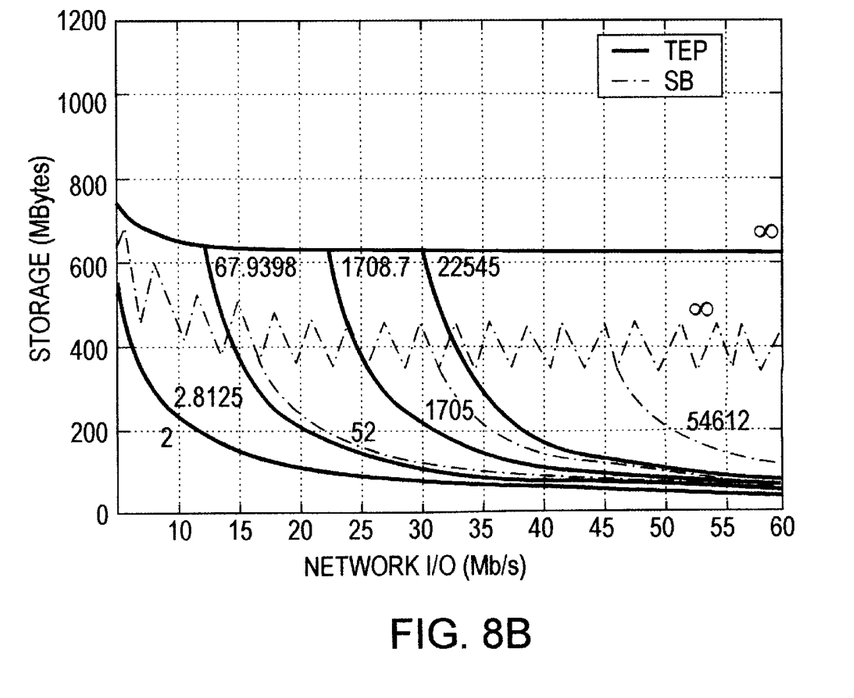

FIGS. 7 and 8 compare the performances of SB and TEP in terms of access latency and storage requirements for download and presentation of a 2-hour movie encoded at 1.5 Mbit/sec using various values of W. In FIGS. 7A and 7B, r(n)=1. The various SB plots (broken lines) correspond to values of W equal to 2, 52, 1705, and 54612 seconds (i.e., the second, tenth, twentieth, and thirtieth elements of the SB sequence set forth above); and the various TEP plots (solid lines) correspond to values of W equal to 2, 55, 1597, and 28657 seconds (i.e., the second, ninth, sixteenth, and twenty-second elements of the truncated Fibonacci sequence set forth above; as previously noted, the value of W should coincide with an allowed value given by the TEP series formula). A value of infinity (i.e., no length restriction) is also shown for illustrative purposes.

Examination of FIG. 7A reveals that access latency declines with increasing network transfer speeds, as would be expected, both for SB and TEP. The access latencies for TEP are significantly lower than those of SB, however, for nearly all values of W, and the magnitude of the difference increases with W. For example, the access latencies associated with W=1597 for TEP are below those associated with W=1705 for SB; and access latencies associated with W=28657 for TEP are similar to those associated with W=54612 for SB. The divergence becomes most pronounced when W=∞.

As shown in FIG. 7B, the storage requirement is a smooth function of network transfer speeds, declining as speed increases. The figure demonstrates that, for comparable values of W, storage requirements for TEP are lower than those for SB.

In FIGS. 8A and 8B, r(n)=1.25. The disparity between SB and TEP in terms of access latency is even more pronounced, as confirmed by the large difference in W values producing similar plots (and the greater divergence at W=∞.

A weakness of any growth-partitioning scheme is that low access latencies are achieved by minimizing the relative length of the first segment, a condition which, as a result of the stepwise growth pattern, mandates a greater overall number of segments. Because each segment is repetitively transmitted over an individual channel, bandwidth requirements increase with the number of segments (and this remains true, of course, even if the channels are logical channels). Accordingly, were it possible to tolerate longer initial segments, bandwidth requirements could be substantially reduced.

This objective may be accomplished by utilizing the non-volatile buffer storage of receivers 115 (see FIG. 1) to cache the first partitions from a plurality of popular movies in anticipation of their being requested by the subscriber. Receivers can then play movies back with no latency while loading in higher-order segments in the manner described above. For example, suppose a receiver were equipped with 10 Gbytes of storage capacity. If 1.5 Gbytes were reserved for higher-order segments, 8.5 Gbytes could be devoted to storage of the first segments (or first few segments) of many movies. Assuming an average encoding rate of 4 Mbits/sec of movie play time and caching of the first 60 seconds of each movie, sufficient data could be stored to provide on-demand access to approximately 29 movie titles.

With finite storage resources on a given receiver and a large library of available movies, it is useful to discriminate among subscribers so that the movies whose initial segments are locally stored represent the ones most likely to be selected by the subscriber. This can be accomplished in numerous ways. Most simply, movies can be associated with meta—information categorizing them in some way (e.g., by genre) and used as the basis for filtering to individual subscribers based on previously expressed preferences. Alternatively, the server can be configured to infer subscriber preferences based on observed viewing habits according to "software agent" techniques well characterized in the art.

Further bandwidth gains are possible by utilizing a multicast model rather than a broadcast model. In a broadcast system, every segment of every available movie is broadcast to every subscriber, regardless of who is actually watching what. In a multicast model, neighborhood distribution nodes can block delivery unwanted partitions and replace them with partitions from desired movies; this occurs without affecting operation of the servers supplying the video data.

Figure 9:
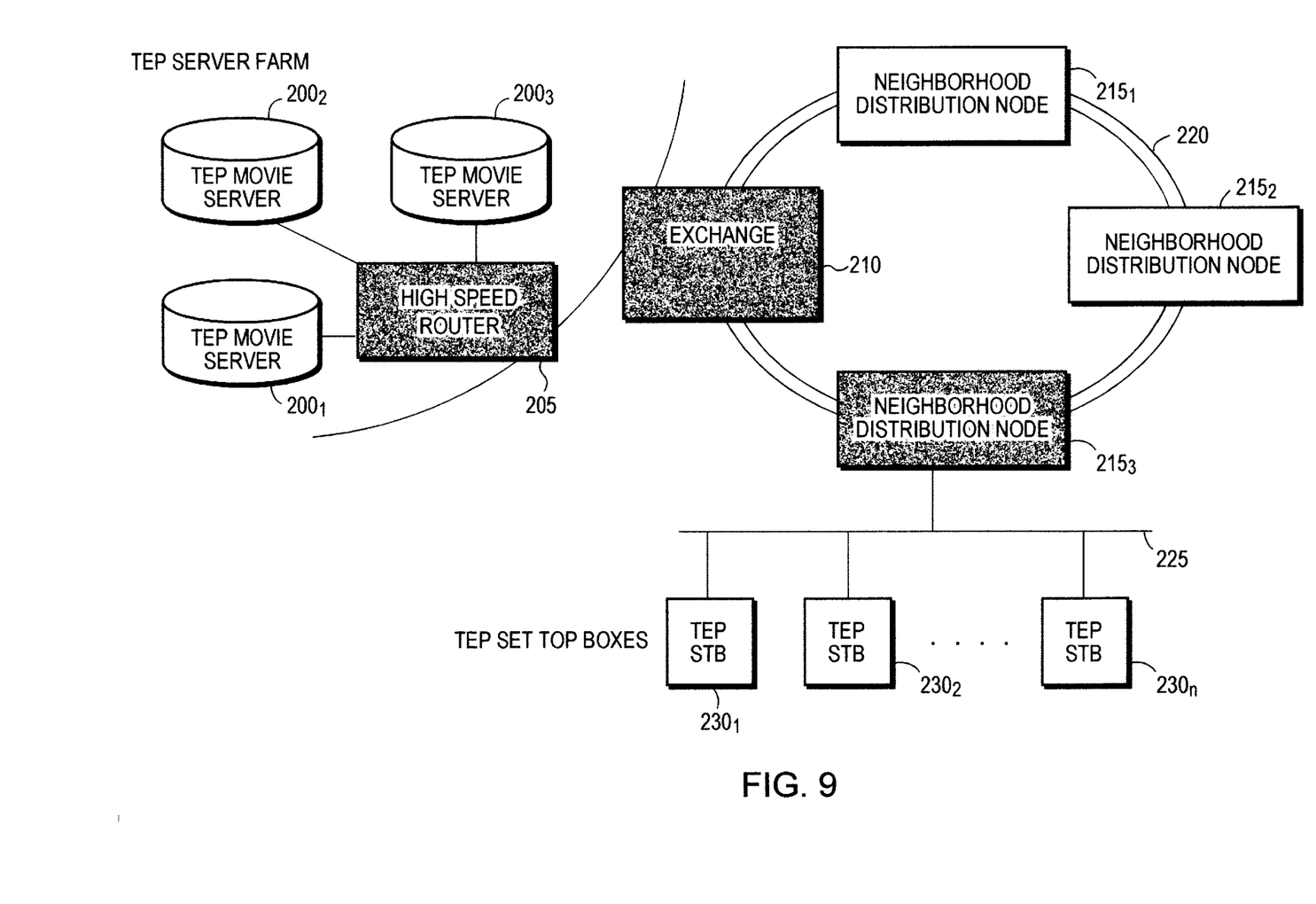
FIG. 9 schematically depicts a multicast VOD system implementing the invention.

An exemplary arrangement is shown in FIG. 9. A "server farm" of multiple video servers $200_1$, $200_2$, $200_3$ transmits the segments corresponding to several hundred movies (partitioned into logical channels) to a high-speed router 205. Router 205 is connected to a regional backbone 210 via a high-speed data connection, e.g., a 5–10 Gbit/sec optical fiber line. Backbone 210 feeds into a series of distribution nodes $215_1$, $215_2$, $215_3$ dispersed around the city via another high-speed connection 220 (e.g., a 2–5 Gbit/sec optical fiber line). Each distribution node 215 is connected to 500–1000 individual subscribers via cable modem connections collectively indicated at 225 (e.g., 750–1000 MHz coax cables capable of delivering 1850 Mbit/sec). Each subscriber has a receiver configured as a set-top box $230_1$, $230_2$, . . . , $230_n$ that is configured to implement TEP in the manner described above.

At each junction between the servers 200 and receivers 230, segment channels can be pruned from the data traffic, so that only those movies actually being viewed by subscribers at a given time actually traverse the entire network. In this way, the servers 200 operate independently of subscriber viewing patterns, simply transmitting data. Overall network bandwidth utilization is nonetheless restricted in accordance with those viewing patterns at the network level through cooperation between the regional and local routers.

It will therefore be seen that the foregoing approach to VOD provides a highly efficient, scalable architecture for streaming video data. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of transmitting a video data file to a receiver for presentation at a playback rate, the method comprising the steps of:
    a. dividing the video file into a plurality of sequentially organized data segments, each date segment having an internal temporal order;
    b. repeatedly transmitting the data segments over a plurality of transmission channels at a transmission rate, the transmission rate being at least equal to the playback rate;
    c. receiving successive sequential data segments such that data from no more than a fixed plurality of channels is received simultaneously, data being received from a new channel only after an entire segment has been received from a previous channel, at least some of the data segments being received discontiguously;
    d. sequentially displaying the data segments with proper internal temporal order notwithstanding discontiguous reception of some of the data segments.

2. The method of claim 1 wherein data from no more than two channels is received simultaneously.

3. The method of claim 1 further comprising the step of reordering the data of discontiguously received segments prior to their display.

4. The method of claim 1 wherein the segments have relative lengths and are received at a download rate, the relative lengths of n segments being determined according to the series function $$f(n) = \begin{cases} r(1) & n = 1 \\ (1 + f(1))r(2) & n = 2 \\ (f(n-1) + f(n-2))r(n) & n \geq 3 \end{cases}$$

where r(n) is the download rate expressed as a multiple of the playback rate.

5. The method of claim 4 wherein the segments have a maximum length determined according to the series function.

6. A method of transmitting a video data file to a receiver for presentation at a playback rate, the method comprising the steps of:
    a. dividing the video file into a plurality of sequentially organized data segments;
    b. repeatedly transmitting the data segments over a plurality of transmission channels at a transmission rate, the transmission rate being at least equal to the playback rate;
    c. receiving successive sequential data segments such that:
        i. data from no more than a fixed plurality of channels is received simultaneously;
        ii. data is received from a new channel only after an entire segment has been received from a previous channel; and iii. until a maximum segment is attained, data is received from no fewer than two channels; and d. sequentially displaying the data segments.

7. The method of claim 6 wherein data from no more than two channels is received simultaneously.

8. The method of claim 6 wherein the segments have relative lengths and are received at a download rate, the relative lengths of n segments being determined according to the series function $$f(n) = \begin{cases} r(1) & n = 1 \\ (1 + f(1))r(2) & n = 2 \\ (f(n-1) + f(n-2))r(n) & n \geq 3 \end{cases}$$

where r(n) is the download rate expressed as a multiple of the playback rate.

9. The method of claim 8 wherein the segments have a maximum length determined according to the series function.

10. A method of transmitting, from a central storage site having a library of video data files, a video data file to a receiver for presentation at a playback rate in response to a request, the method comprising the steps of:

a. dividing each of the video files into a plurality of sequentially organized data segments, the data segments increasing in length from a first segment to a maximum-length segment;

b. prior to receiving the request, pre-storing at least the first segment of a plurality of video data files on the receiver, the plurality of video data files including the requested video file;

c. repeatedly transmitting the data segments of the requested video file over a plurality of transmission channels at a transmission rate, the transmission rate being at least equal to the playback rate;

d. causing the receiver to receive successive sequential data segments such that data from no more than a fixed plurality of channels is received simultaneously, data being received from a new channel only after an entire segment has been received from a previous channel;

e. sequentially displaying the data segments beginning with the pre-stored data.

11. The method of claim 10 wherein the receiving step begins substantially simultaneously with display of the pre-stored data.

12. A receiver for receiving, for presentation at a playback rate, video data files divided into a plurality of sequentially organized data segments, each data segment having an internal temporal order and being repeatedly transmitted over a plurality of transmission channels at a transmission rate, the transmission rate being at least equal to the playback rate, the receiver comprising:

a. means for accessing the transmission channels and asynchronously receiving successive sequential data segments such that
  i. data from no more than a fixed plurality of channels is received simultaneously;
  ii. data is received from a new channel only after an entire segment has been received from a previous channel; and
  iii. at least some of the data segments being received discontiguously; and b. means for causing sequential display of the data segments with proper internal temporal order notwithstanding discontiguous reception of some of the data segments.

13. The receiver of claim 12 wherein the segments have relative lengths and are received at a download rate, the relative lengths of n segments being determined according to the series function $$f(n) = \begin{cases} r(1) & n = 1 \\ (1 + f(1))r(2) & n = 2 \\ (f(n-1) + f(n-2))r(n) & n \geq 3 \end{cases}$$

where r(n) is the download rate expressed as a multiple of the playback rate.

14. A receiver for receiving, for presentation at a playback rate, video data files divided into a plurality of sequentially organized data segments, each data segment being repeatedly transmitted over a plurality of transmission channels at a transmission rate, the transmission rate being at least equal to the playback rate, the receiver comprising:

a. means for receiving successive sequential data segments such that:
  i. data from no more than a fixed plurality of channels is received simultaneously;
  ii. data is received from a new channel only after an entire segment has been received from a previous channel; and
  iii. until a maximum segment is attained, data is received from no fewer than two channels; and d. means for causing display of the data segments.

15. The receiver of claim 14 wherein the segments have relative lengths and are received at a download rate, the relative lengths of n segments being determined according to the series function $$f(n) = \begin{cases} r(1) & n = 1 \\ (1 + f(1))r(2) & n = 2 \\ (f(n-1) + f(n-2))r(n) & n \geq 3 \end{cases}$$

where r(n) is the download rate expressed as a multiple of the playback rate.

16. A receiver for receiving, for presentation at a playback rate, video data files from a central storage site having a library of video data files, the data files being divided into a plurality of sequentially organized data segments, each data segment being repeatedly transmitted over a plurality of transmission channels at a transmission rate, the transmission rate being at least equal to the playback rate, the receiver comprising:

a. means for receiving, prior to the request, at least the first segment of a plurality of video data files, the plurality of video data files including the requested video file;

b. means for storing the received segments;

c. means for receiving successive sequential data segments of the requested video file from no more than a fixed plurality of channels simultaneously, data being received from a new channel only after an entire segment has been received from a previous channel; and d. means for causing sequential display of the data segments beginning with the pre-stored data.

* * * * *